United States Patent
Clare et al.

(10) Patent No.: US 10,078,556 B2
(45) Date of Patent: Sep. 18, 2018

(54) DATA REPLICATION BETWEEN DATABASES WITH HETEROGENIOUS DATA PLATFORMS

(71) Applicant: PAYPAL, INC., San Jose, CA (US)

(72) Inventors: Steve Clare, San Jose, CA (US); Liana Sanoyan, Sunnyvale, CA (US); Jian Huang, San Jose, CA (US); Suresh Appavu, San Jose, CA (US); Sandip Das, Sunnyvale, CA (US); Paul Kazakov, San Jose, CA (US); Prabhagaran Subramaniam, Chennai (IN); Mutharasan Nainar, Chennai (IN)

(73) Assignee: PAYPAL, INC., San Jose, CA (US)

( * ) Notice: Subject to any disclaimer, the term of this patent is extended or adjusted under 35 U.S.C. 154(b) by 359 days.

(21) Appl. No.: 14/841,154

(22) Filed: Aug. 31, 2015

(65) Prior Publication Data

US 2017/0060695 A1  Mar. 2, 2017

(51) Int. Cl.
*G06F 17/00* (2006.01)
*G06F 11/14* (2006.01)
*G06F 3/06* (2006.01)
*G06F 17/30* (2006.01)

(52) U.S. Cl.
CPC .......... *G06F 11/1451* (2013.01); *G06F 3/065* (2013.01); *G06F 17/30575* (2013.01)

(58) Field of Classification Search
CPC . G06F 11/1451; G06F 17/30575; G06F 3/065
USPC ........................................ 707/624, 646, 685
See application file for complete search history.

(56) References Cited

U.S. PATENT DOCUMENTS

| | | | |
|---|---|---|---|
| 7,870,476 B2 * | 1/2011 | Dorwart | G06F 17/246 715/200 |
| 8,433,867 B2 * | 4/2013 | Eastman | G06F 11/1451 707/646 |
| 8,533,194 B1 * | 9/2013 | Ravid | G06N 99/005 707/736 |
| 8,700,567 B2 * | 4/2014 | Watanabe | G06F 17/302 707/609 |
| 9,606,877 B2 * | 3/2017 | McHugh | G06F 11/1471 |
| 2007/0156793 A1 * | 7/2007 | D'Souza | G06F 11/1458 707/999.204 |
| 2012/0221532 A1 * | 8/2012 | Watanabe | G06F 17/30165 707/687 |
| 2014/0188797 A1 * | 7/2014 | Araki | G06F 17/30575 707/624 |
| 2016/0342485 A1 * | 11/2016 | McHugh | G06F 11/1471 |

* cited by examiner

*Primary Examiner* — Phong H Nguyen
(74) *Attorney, Agent, or Firm* — Haynes and Boone, LLP

(57) ABSTRACT

A system and method for data replication for databases using an intermediary server, the intermediary server choosing the order in which databases are replicated, the utilities used for each of the steps in the data replication process, the timing of the replication, and/or the timing each step of the data replication process is performed.

20 Claims, 7 Drawing Sheets

DATA REPLICATION BETWEEN DATABASES WITH HETEROGENIOUS DATA PLATFORMS

BACKGROUND

Field of the Invention

The present invention generally relates to replicating data between databases using different database platforms and more specifically using an intermediary server to manage data replication.

Related Art

Entities that deal with large amounts of data often maintain several databases using different database platforms. Because different database platforms offer different advantages with regards to costs, use of resources, toolsets, and other differences, it is beneficial to maintain redundant data over multiple databases with differing platforms. For example, an entity may use one database platform for production, another database platform for a certain functionality such as a full text search, and yet another database platform for data analytics. One or more of the databases will often be updated with new information before one or more other databases. For example, the production database will often be updated in real time with new information. To maintain the redundant data, the other databases are updated with the new data that the production database receives. Updates can be done through data replication. The up-to-date databases, such as the production database, can be used to replicate the new data on other databases.

However, when replicating data over databases with different data platforms, replicating data from one database to another can be resource intensive and costly. Therefore a system and method that manages the data replication based on resource availability and cost efficiency would be beneficial.

Figure 1:
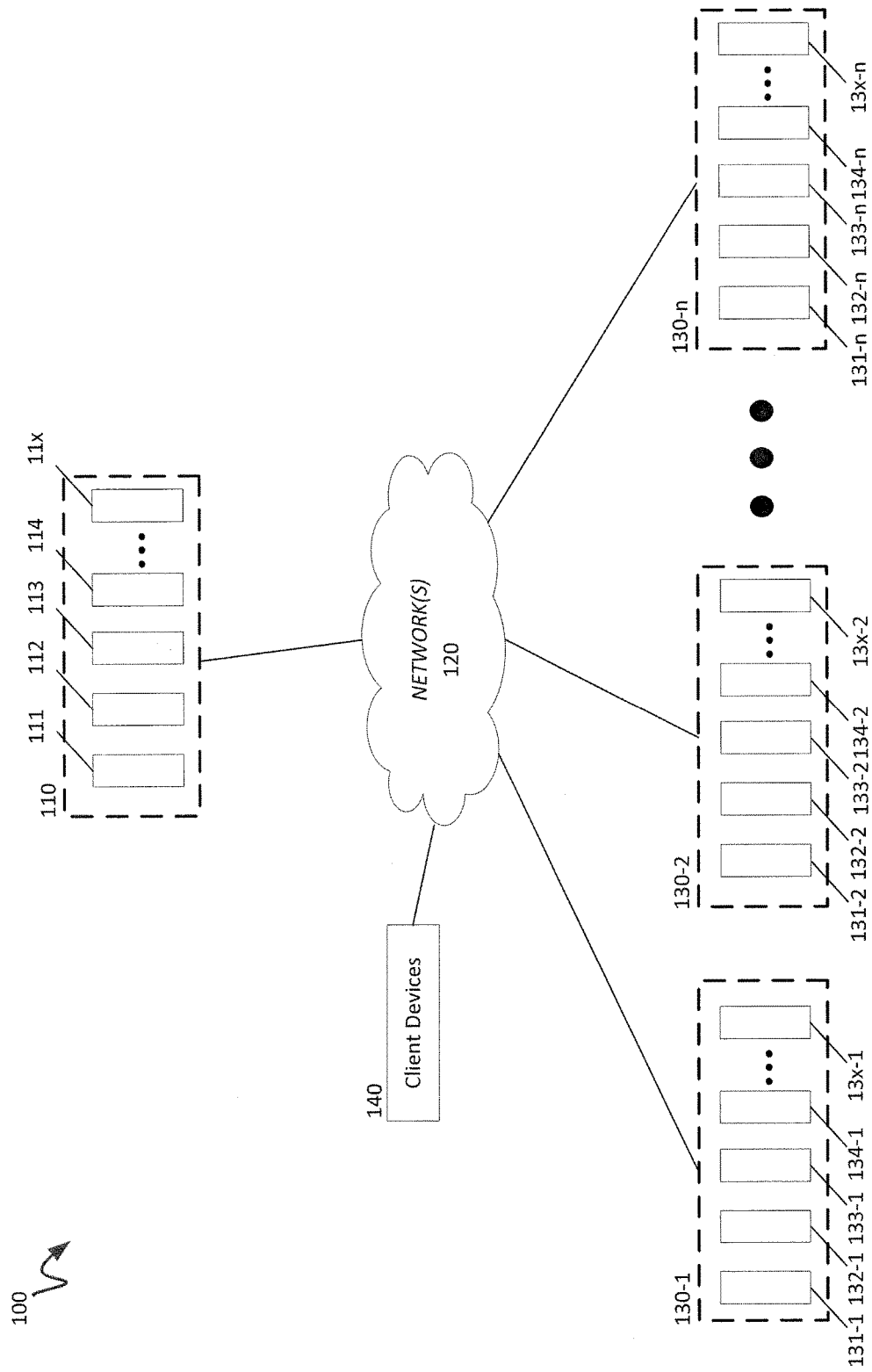
FIG. 1 is a block diagram of an exemplary networked system suitable for implementing one or more processes for replicating data between database servers using different database platforms.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a system and method for homogenizing, updating, and/or replicating data over one or more different databases is disclosed. Because different database platforms are better suited for certain jobs and have different price points, data tables are often stored redundantly in different databases with various types of database platforms. For example it may be cheaper to do certain jobs on a Hadoop® platform than on an Oracle® or Teradata® database. Additionally some database platforms or other platforms, such as Hadoop®, have capabilities that other databases platforms do not, such as the ability to perform map reduce. Thus, it may be beneficial to have data held redundantly on multiple databases with different platforms and/or over different file system platforms.

In some embodiments, to ensure the information on a source database is redundantly held by one or more databases, changes to one database may be replicated on the other databases. The database with the data being replicated may sometimes be referred to as the source database and the database receiving the replicated data may be referred to as the target database. In some embodiments, a source database may maintain or create an incremental or the delta (change) to the database. The incremental may be copies of all the changes and new entries that are made to one or more data tables held on or stored in a database. For example, there may be an Oracle® database being updated with the new data entries and the delta or incremental may be a copy of the changes. There may be other older data entries in the Oracle® database that were not changed, and this information may not be part of the incremental. In some embodiments, the incremental may be maintained on a non-transitory computer readable medium. In some embodiments, the non-transitory computer readable medium may be a cache of the source database. In some embodiments, the incremental may be created and/or stored in response to instructions from an intermediary server that may manage the replication of data between databases.

In some embodiments, the intermediary server may extract the incremental from the source database and load it on the target database. In some embodiments, the intermediary server may store the extracted incremental on a memory of the server and then load the extracted incremental onto one or more target databases from the memory of the intermediary server. In some embodiments, when the incremental is extracted from the source database, the intermediary server may transform the data into another data format. In some embodiments, the memory that the incremental is held in may be a cache of the intermediary server. In some embodiments, when loading the incremental onto the target database, the incremental may be loaded in a cache of the target database.

In some embodiments, the target database may apply the incremental to one or more data tables in the target database such that the data in the target database matches the source database. In some embodiments, the source database may have a data table where some of the information is old and the some of the information is new. The incremental may be characterized by the new information in the source database. The target database may have a redundant copy of the old information in the source database. When the incremental is applied to the target database, the target database may be updated to have the same old and new information as the source database. In some embodiments, the target database may apply the incremental upon instruction from the intermediary server.

In some embodiments, there may be several utilities for each of the data replication processes. For example, each of the following processes may each have several utilities capable of performing each process: creating/maintaining an incremental on the source database, extracting the incremental from the source database, loading the incremental into a target database, and applying the incremental to the data tables of the target database.

In some embodiments, the intermediary server may determine which utility is used for each of the processes and when they are used. In some embodiments, the intermediary server may determine the order in which target databases are updated and which databases to use as source databases. For example, a target database, after having an incremental applied to it, may be used as a source database for another target database.

In some embodiments, the intermediary server may schedule data replication between databases based on the availability of resources in one or more databases. The intermediary server may monitor resources such as CPU usage, number of processes being run on one or more databases, cache availability, utility availability, memory arability, and/or the like. In some embodiments, the intermediary server may instruct the source or target database to conduct one or more of the processes for data replication when one or more of the monitored resources meet one or more criteria. In some embodiments, the criteria may be predetermined.

In some embodiments, the technique and/or utilities used for each of the data replication processes may be based on predetermined rules provided to and/or programmed into the intermediary server. For example, there may be five utilities capable of the extraction process. The rules may dictate which utility to attempt first and which utility to attempt next in the event a utility fails or is unavailable. This may similarly apply for the other processes used for data replication such as the processes for maintaining/creating the incremental, loading the incremental, and applying the incremental.

In some embodiments, the intermediary server may choose the utilities and data replication order for server in the most efficient method or most efficient method available.

In some embodiments, the intermediary server may attempt to optimize the data replication for cost, time, resource usage, and/or the like. The intermediary server may optimize for cost through determining the most cost efficient order in which replication is performed on target servers, determining which target servers to use as source servers after data replication is performed, determining which utilities are used for each of the processes of data replication, and so forth.

In some embodiments, the intermediary server may receive resource readings from the source and target servers and use the resource readings to determine an optimum time and/or choice of utilities to use for data replication.

In some embodiments, the intermediary may maintain a log for each data replication performed. The log may maintain information regarding the data replication. The information may include characteristics of the incremental data (e.g. number of entries, file format, size, and/or the like), the databases participating in the data replication, the utilities used and/or attempted for the data replication, failures of any utility, the run time of the utilities, amount of resources from the database each utility used, and/or the like. In some embodiments, the intermediary server may use the log to continue to optimize the data replication process by identifying which utilities failed the least, ran the fastest, used the least resources, and/or the like. The intermediary server may use the characteristics of an incremental for replication to filter the log file. In this manner, the intermediary server may optimize data replication using a dataset from the log file that is more likely to be relevant to the incremental being replicated.

In some embodiments, the intermediary server may be configured to provide an intuitive graphical user interface (GUI) for which a user may interact with to instruct the intermediary server to schedule a replication and/or perform and adhoc replication instance. In some examples, the GUI may provide the capability of dragging and dropping icons to instruct the intermediary server to conduct a data replication. The drag and drop icons may represent databases. The dragged and dropped icon may be the source database and the icon being dropped on may be the target database.

In some embodiments, a system includes an intermediary server configured to conduct a data replication. The server may perform the steps of determining the available extraction utilities for extracting an incremental from a source database; determining an optimal extraction utility from the available extraction utilities; using the optimal extraction utility to extract the incremental onto the intermediary server; determining the available loading utilities for a target database server; determining an optimal loading utility from the available loading utilities; loading the incremental from the intermediary server to the target database; and causing the target database to update a data table stored in the target database with the incremental.

In some embodiments, a computer implemented method of data replication includes the steps of selecting a first extraction utility from a plurality of extraction utilities based on a data format used on a source database; using the first extraction utility to extract the incremental onto an intermediary server; selecting a first loading utility from a plurality of loading utilities based on a data format used on a target database; using the first loading utility to load the incremental from the intermediary server to the target database; and causing the target database to update a data table stored in the target database with the incremental.

In some embodiments, a system includes a source database storing a first data table having old information and new information, the source database configured to create an incremental based on the new information. The system may also include a target database storing a second data table having the old information. The target database may be configured to update the second data table with the incremental when the incremental is loaded into the target database such that the second data table contains both the old information and new information. The system may also include an intermediary server with hardware memory and a processor. The processor may be configured to extract the incremental from the source database onto the hardware memory and load the incremental from the hardware memory into a target database.

While the various examples disclosed herein focus on particular aspects regarding data replication using an intermediary server, it will be understood that the various inventive principles and embodiments disclosed herein can be applied to other types of arrangements as well. For example, there may be multiple source databases with different incremental data but used to update a target database.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium may have computer readable and executable code for instructing one or more processors to perform any of the methods disclosed herein.

Beginning with FIG. 1, a block diagram is shown of a networked system 100 suitable for implementing one or more processes for replicating data between database servers using different database platforms. System 100 may comprise or implement a plurality of servers and/or software components that operate to perform various operations. Exemplary servers may include, for example, stand-alone and enterprise-class servers operating a server OS such as a MICROSOFT® OS, a UNIX® OS, a LINUX® OS, Solaris® OS, Oracle Linux® OS or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

In some embodiments, system 100 may include servers 110, which may be composed of one or more servers, such as servers 111, 112, 113, and 114-11x. Server 110 may be a data replication server that serves as an intermediary between databases during replication. System 100 may include database 130-1 which may be made of one or more servers, such as servers 131-1, 132-1, 133-1, and 134-1-13x-1. System 100 may also include additional databases 130-2 through 130-n which may each be made of one or more servers, such as servers 131-2-13x-2 and 131-n-13x-n. As shown in FIG. 1, x represents the last server and n represents the last database of system 100, indicating the expandability of system 100.

In some embodiments, each of the databases 130-1-130-n may implement one or more database platforms and/or file system platforms including, but not limited to, MySQL, NoSQL, Oracle, Teradata, Hadoop, and/or other platforms. For example, database 130-1 may be an Oracle database, database 130-2 may use the Hadoop platform, and 130-3 (not shown) may be a Teradata database. System 100 may operate with more or less than the number of servers and databases shown in FIG. 1. In some embodiments, database 130-2 instead of being databases, may be one or more computing devices implementing a distributed file system, such as Hadoop.

In some embodiments, system 100 may include one or more client devices 140 that may be used to communicate with and/or provide instructions to one or more devices in system 100. Client devices 140 may be implemented using any appropriate hardware and software. For example, in one embodiment, client devices 140 may be implemented as a personal computer (PC), a smart phone, personal digital assistant (PDA), laptop computer, smart watch, and/or other types of computing devices capable of transmitting, receiving, and/or creating machine-readable data, such as an iPhone™ from Apple™. In some embodiments, one or more of the servers within system 100 may double as one or more of client devices 140.

Client devices 140 may include one or more applications which may be used, for remotely accessing and communicating with one or more of the servers of system 100. Client devices 140 may provide a convenient interface to permit a user to interact with client devices 140. Client devices 140 may further include other applications as may be desired in particular embodiments to provide desired features to client devices 140. For example, other applications may include security applications for implementing client-side security features, programmatic client applications for interfacing with appropriate APIs over a network, such as network 120 discussed in more detail below, or other types of applications.

In some embodiments, client devices 140 may include communication applications with associated interfaces that enable client devices 140 to communicate within system 100.

Client devices 140 may include screens capable of displaying information and/or content. Some examples of displays and screens which one or more of client devices 140 may include, but are not limited to, mobile device displays, monitors, e-ink displays, projection displays, or any other suitable display technologies.

Client devices 140 may include one or more input/output devices (e.g., a keypad, a keyboard, a touch sensitive component, a microphone, a camera, gyroscope, accelerometer, and the like). In some examples, the display of client devices 140 may be a touch screen that doubles as one of the input/output devices. User devices 140 may monitor user input on the touch screen, on any other touch-sensitive device (e.g., a touchpad on a laptop), and/or other input components (e.g., an accelerometer) and may recognize user input for association with user instructions.

As shown, client devices 140, severs 110, and databases 130-1-130-n may be interconnected by one or more networks 120. Networks 120 may be implemented as a single network or a combination of multiple networks. For example, in various embodiments, network 120 may include the Internet or one or more intranets, landline networks, wireless networks, other appropriate types of networks and a combination thereof. In some embodiments, networks 120 may include devices that serve as a middle tier between one or more of client devices 120 and the servers of system 100. In some embodiments, one or more of the servers of system 100 may serve as the middle tier. The middle tier may be used to prevent direct internet traffic and/or direct network connections between on or more client device 140 and one or more server of system 100.

Figure 2:
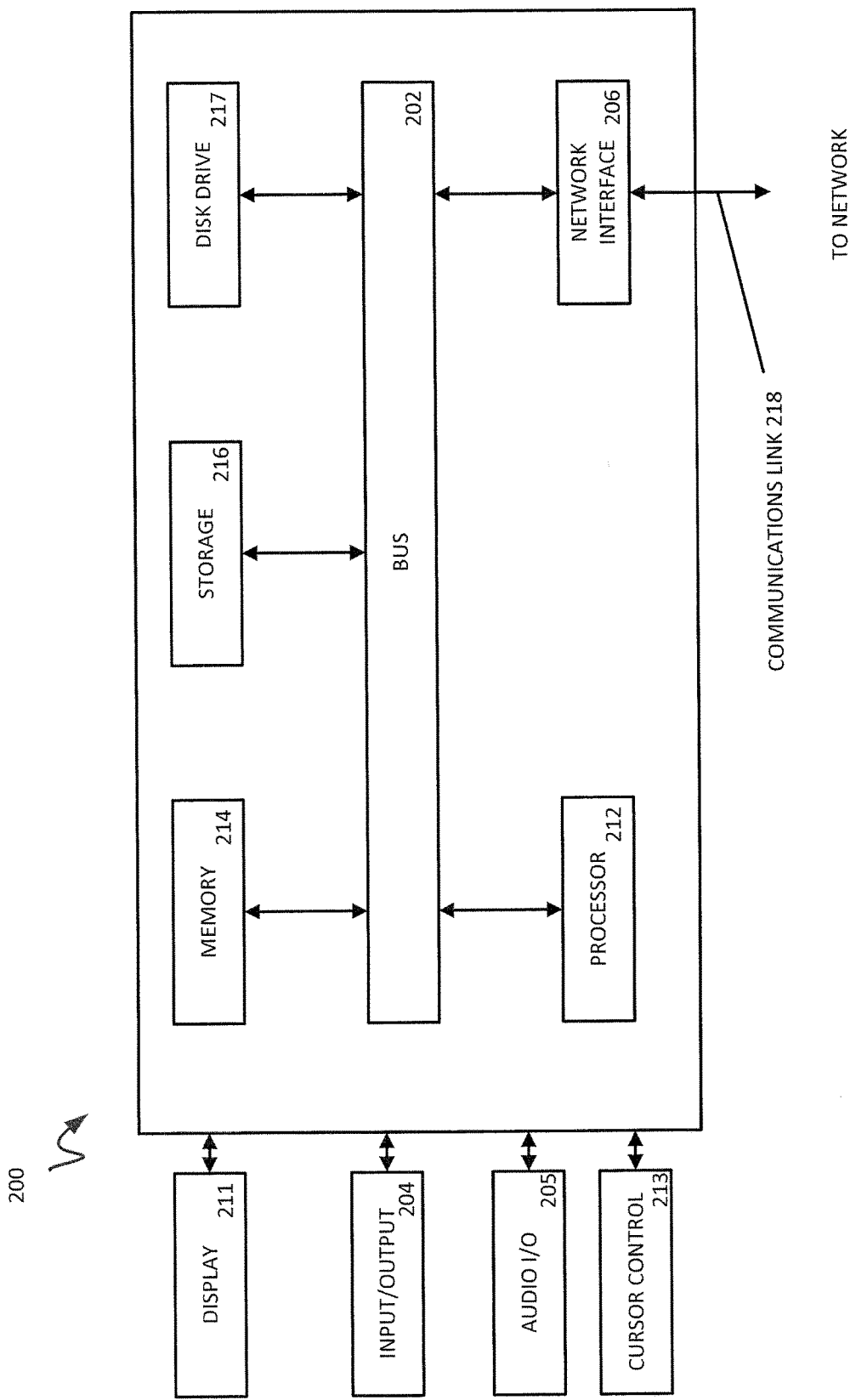
FIG. 2 is a block diagram of an exemplary computer system suitable for implementing one or more embodiments.

FIG. 2 is a block diagram of a computer system 200 suitable for implementing one or more embodiments of the present disclosure. In various implementations, a client device may comprise a personal computing device (e.g., smart phone, a computing tablet, a personal computer, laptop, PDA, Bluetooth device, key FOB, badge, etc.) capable of communicating with a network. A database or server may utilize a network computing device (e.g., a network server) capable of communicating with the network. It should be appreciated that each of the devices discussed herein may be implemented as computer system 200 in a manner as follows.

Computer system 200 includes a bus 202 or other communication mechanism for communicating information data, signals, and information between various components of computer system 200. Components include an input/output (I/O) component 204 that processes a user action, such as selecting keys from a keypad/keyboard, selecting one or more buttons or links, performing a gesture, etc., and sends a corresponding signal to bus 202. I/O component 204 may also include a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 may transmit and receive signals between computer system 200 and other devices, such as another user device, a merchant server, or a payment provider server via a network. In one embodiment, the transmission is wireless, although other transmission mediums and methods may also be suitable. A processor 212, which may be a combination of multiple processors including, but not limited to, a micro-controller, digital signal processor (DSP), or other processing component, processes these various signals, such as for display on computer system 200 or transmission to other devices via a communication link 218. Processor 212 may also control transmission of information and/or instructions to other devices.

Components of computer system 200 may also include a system memory component 214 (e.g., RAM), a static storage component 216 (e.g., ROM), and/or a disk drive 217. Computer system 200 may perform specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In some embodiments, the logic may be encoded in non-transitory computer readable medium. In some examples, transmission media may take the form of acoustic or electromagnetic waves, such as those generated during radio, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, SSD, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 3:
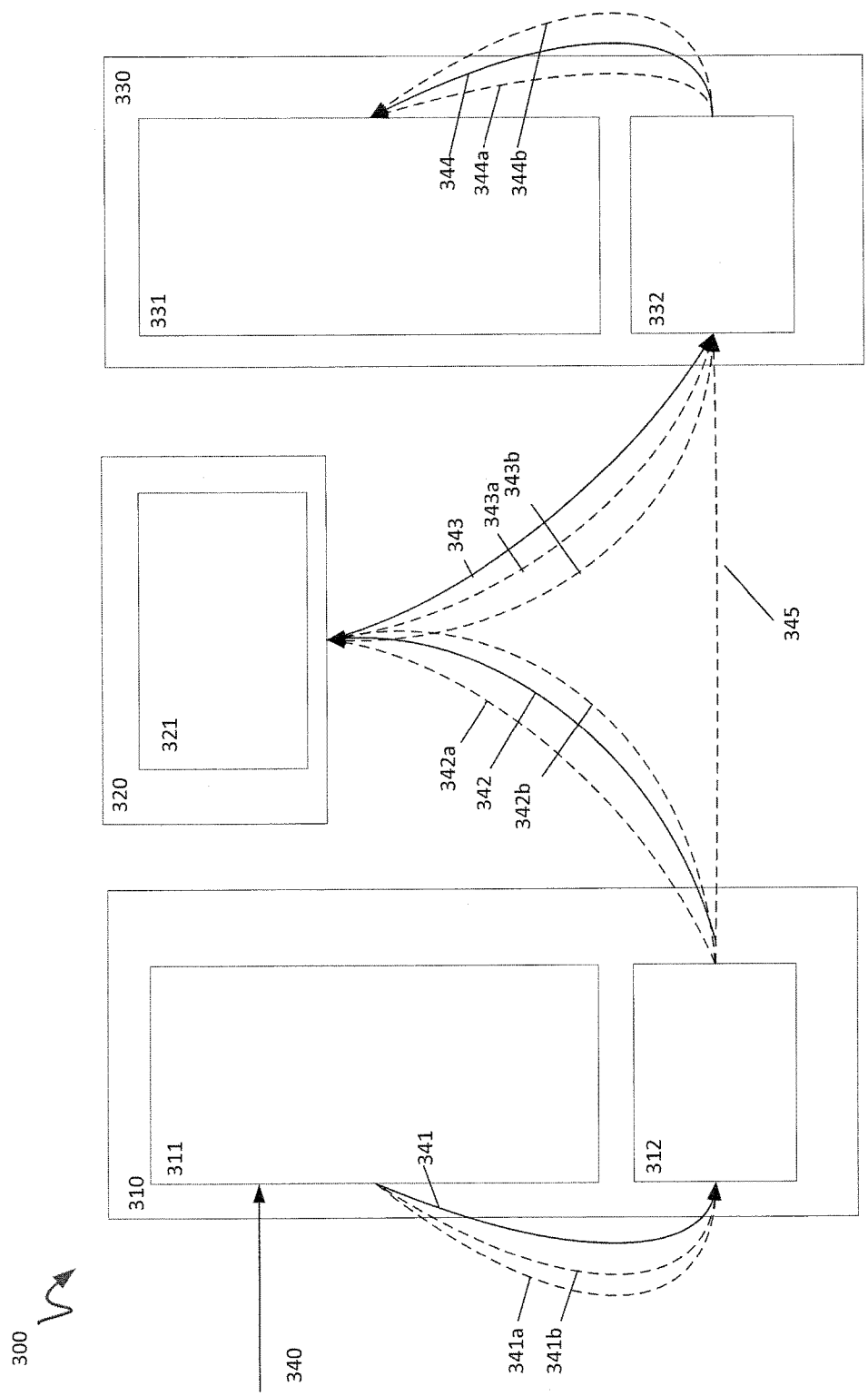
FIG. 3 is a simplified block diagram illustrating an exemplary system conducting a data replication managed by an intermediary server.

Referring now to FIG. 3, FIG. 3 is a simplified block diagram illustrating a system 300 conducting a data replication between source database 310 and target database 330 managed by an intermediary server 320 according to some embodiments.

As shown, source database 310 may include a data table 311 that may be held or stored in non-transitory computer readable media. Database 310 may be receiving updates and/or changes to data tables 311 from one or more devices over network connect 340. Source database 310 may maintain data space 312 for maintaining or putting an incremental and/or for staging. The incremental may be indicative of the changes to data table 311 by the one or more devices over network connection 340. Staging refers to a storage area that may be used to temporarily store data, such as the incremental. The staging area may be regularly erased, such as whenever a new extraction and/or loading occurs.

The incremental may be data that represents the "delta" or changes to one or more of the tables in the database. In some examples, the incremental may represent the change to one or more tables in the database with respect to a temporal reference point. The incremental may represent the difference between data held on the database at a first temporal reference point, such as a historical time point, and a second temporal reference point, such as another historical time point or current time. For example, an incremental may be copies of changes to the database since the last time the database was replicated. In this example, the first temporal time point would be the time of the last replication and the second temporal time point would be current time. In some examples, the incremental may be exact copies of any changes made to the data held in the database or new data held in the database. In some examples the incremental may be the differences in the information between one or more tables held in a first database and a second database. In some examples the incremental may not maintain the differences that are a result of databases using different platforms and/or data formats.

In some examples, the non-transitory computer readable media for data space 312 may be different from the non-transitory computer readable media maintaining table 311. For example, database 310 may maintain the table in a first non-transitory computer readable media with large data storage capacity, such as one or more hard drive disks (HDD), and the data space 312 may be stored in a second separate non-transitory computer readable medium with a faster read and/or write ability than the first non-transitory computer readable media, such as a RAID array, solid state drive (SSD), RAM, FLASH memory, and/or the like. In some embodiments, table 311 may be held in disk space and data space 312 may be space on memory or cache. However, in some embodiments, both the data table 311 and data space 312 may share the same non-transitory computer readable media.

In some embodiments, the incremental held or written to cache may be maintained temporarily until one or more replications have occurred. In some embodiments, the non-transitory computer readable media used for cache and/or memory may lose its contents when it loses power. In some embodiments, the non-transitory computer readable media used for maintaining data table 311 may retain its contents irrespective of power. In some embodiments, the non-transitory compute readable media maintaining the cache may have a separate or backup power supply to ensure the data is not lost during a power outage. Target sever 330 may be similar to sever 310 and also have a table 331 and a data space 332.

In some embodiments, the cache may be distinguished from normal disk space based on how the memory is treated. For example, a system may have programmed cache to be wiped or enable data stored in the cache to be overwritten after a certain period of time, such as 90 days. In some examples, the cache may be in a different format than the normal disk space.

Intermediary server 320 may maintain an extraction space 321 for extracting and/or holding an incremental from one or more databases. The extraction space 321 may also be used to load data from the extraction space to a database, such as database 330. Extraction space 321 may be space for data in one or more non-transitory computer readable media of intermediary server 320. In some embodiments, extraction space 321 may be a cache of server 320.

As depicted in FIG. 3, an exemplary data replication route is shown using incremental creation path 341, extraction path 342, loading path 343, and application path 344. Path as described herein references any mechanism and/or utility that may be used for moving and/or copying data from one place to another as part of a replication. This may include optional ways of moving and/or copying data within a single non-transitory computer readable media and/or from one non-transitory computer readable media to another. A data replication route, as discussed herein, is the combination of paths used for replicating at least a part of a table in one database to another database. The number of paths in a route may have fewer paths than depicted in FIG. 3. For example, a route may have fewer paths by skipping the extraction from data space 312 to extraction space 321 and instead going directly from data space 312 to data space 332 using path 345. In some examples, the route may have fewer paths by having a different starting points and end destinations.

Similarly there may be more paths in a data replication route. For example, a route may include replicating data from database 310 to another database (not shown) including a path to and from intermediary server 320 and then replicating from the other database to database 331, which may also include a path to and from intermediary server 320.

Also, shown in FIG. 3, there may be several alternative paths 341*a*, 341*b*, 342*a*, 342*b*, 343*a*, 343*b*, 344*a*, and 344*b* that could have been tried or available for conducting the data replication between database 310 and 330. For example, there may be several alternative methods of establishing an incremental on data space 312 (incremental creation path), each representing a path, such as 341*a* and 341*b*. One or more paths for establishing an incremental may be one or more techniques of change data capture (CDC), such as using time stamps, version numbers, status indicators, triggers, transaction logs and/or the like or a combination thereof. Each of these options may represent a path. The time stamp technique for CDC may use a timestamp in the data tables to determine when a certain entry was changed and/or added to the table. When the time stamp is after a certain time point, such as the last time replication was conducted, that entry may be copied to data space 312 as part of a table representing changes to table 311. CDC using version numbers work in a similar manner. The data entries may be given a version number, and when one or more entries are added or changed, those entries may be updated to a current version number. Any entry with a current version number may represent changes to data table 311.

Status indicator based CDC uses a Boolean data type to indicate whether an entry in the database is new. For example, 0 can be used to indicate no change and 1 used to indicate change. Note that using time stamps and version numbers provides a level of granularity in CDC that is not possible when using the status indicators for CDC. A transaction log is a log that records any actions conducted on the data table, and the log can be scanned to determine which data table entries have been changed and/or are new. Another technique for creating the incremental includes copying any changes and or new entries to a data table on data space 312 as they occur (in real time or near real time) on data table 311.

Similarly to having multiple incremental creation paths, there may also be several paths for extracting, loading, and applying the incremental. Some of the paths are dependent on the database platform used. For example, some utilities for extracting data from a Teradata database include, but are not limited to, Teradata Parallel Transporter (TPT) export, Teradata fastexport, Teradata ODBC selector, copyFromLocal, WebHDFS REST API based utility, Call-Level Interface (CLI) selector, and/or the like. There may also be different incremental application utilities including, but not limited to, insert, insert not exist, insert ignore, replace, insert update, and/or the like. Similar to the extraction utilities, there are many different incremental load and application utilities available and may depend on the database platform. All the different extract, CDC, load, and incremental application utilities for any database platform are contemplated herein and may be considered paths of a data replication route.

Similarly there are many different utilities for loading and applying an incremental. Some exemplary utilities for loading include, but are not limited to, TPT stream, TPT load, Teradata fastload, Oracle SQL Loader, copyToLocal, WebHDFS REST API based utility, and/or the like. There are also may be different incremental application utilities, including, but not limited to, insert, insert not exist, insert ignore, replace, insert update, and the like. Similar to the extraction utilities, there are many different incremental load and application utilities available and may depend on the database platform. All the different load and application utilities for any database platform are contemplated herein and are considered as load and application paths of a data replication route.

Figure 4:
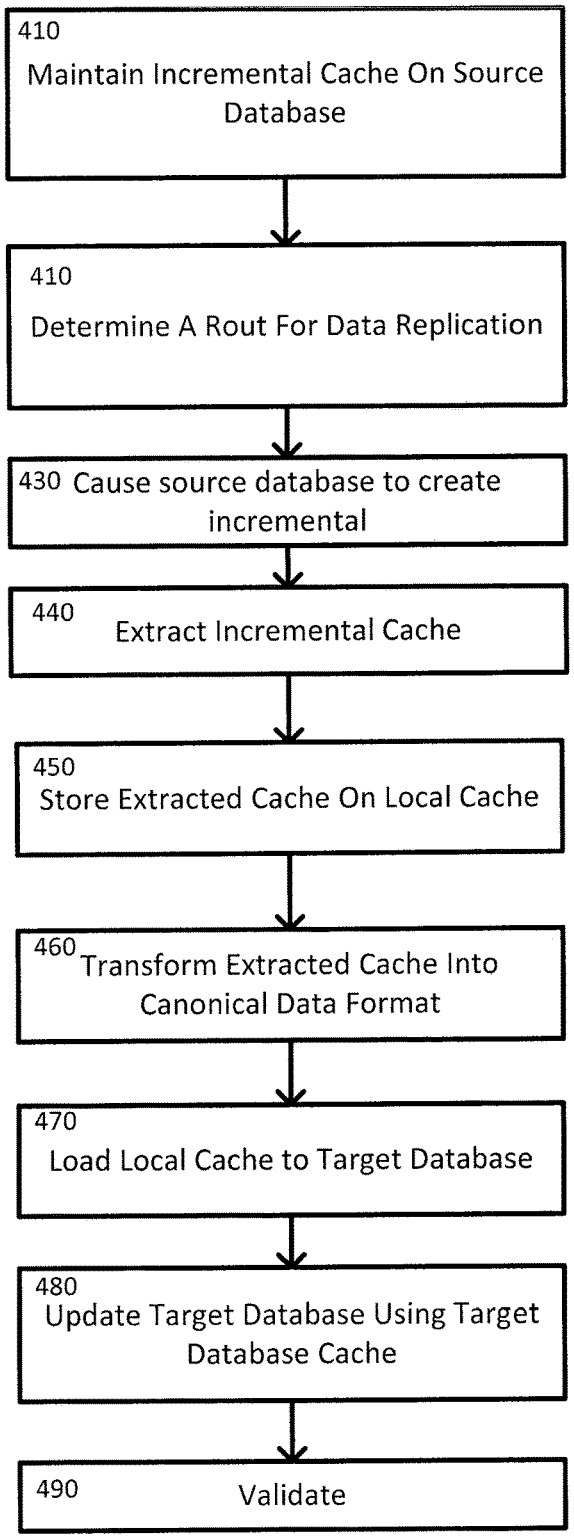
FIG. 4 is a simplified diagram of an exemplary method for replicating data between databases with heterogeneous data platforms according to some embodiments

Referring now to FIG. 4, FIG. 4 is a simplified diagram of a method 400 for replicating data between databases with heterogeneous data platforms according to some embodiments. In some embodiments, method 400 may be implemented by or as part of a system such as system 100 of FIG. 1 and/or system 300 of FIG. 3. For example, in some embodiments, method 400 may be performed by server 111 of FIG. 1 and/or intermediary server 320 of FIG. 3. According to some embodiments, method 400 may include one or more of the processes 310-380 which may be implemented, at least in part, in the form of executable code stored on a non-transitory, tangible, machine readable media that when run on one or more processors (e.g., the processor 212 of FIG. 2) may cause the one or more processors to perform one or more of the processes 310-380.

For the sake of clarity, method 400 is discussed herein as being performed by a single server; however, method 400 may be implemented on several servers and/or devices with the performance of one or more of the processes being split and/or shared among multiple servers and/or devices.

At process 410, the server may receive instructions to replicate tables or data from a source database, such as database 130-1 of FIG. 1, to a target database, such as database 130-2 of FIG. 1. In some examples, the instructions may be received from a client device, such as one of client devices 140. In some examples, the instructions may be received as part of a script or configuration on the server. In some examples the instructions may be received from a user through one or more input/output devices that are part of the server.

In some embodiments, the source database may maintain one or more data tables that are regularly updated by adding new data entries and/or changing existing data entries. In some embodiments, the target database may maintain one or more data tables that are at least partially redundant to one or more of the data tables in the source database. The redundant data tables in the target database may be used to maintain the same information as the data table in the source database, but in a different data format. In some embodiments, the source and target database may be implementing different database platforms and/or data tables. In this manner, the redundant data tables within the target database may contain the same information, but in different data formats.

At process 420, the server may determine a route for data replication from the source database to the target database. The route may choose the specific paths used for replicating the data. The paths may include the incremental creation path, extraction path, loading path, and application path as described above. Each path may be chosen based on numerous factors, such as the cost of each path, availability of each path, efficiency of each path, the data format of the target database, the resources being used on the source and/or target database, and/or the like. In some embodiments, multiple options for a path may be specified in case one or more paths are unavailable. In some examples, the server may determine an order of paths to attempt until all path options have been exhausted. Furthermore, in some embodiments, the server may also determine the schedule of when each path in the route is conducted. In some embodiments, as part of determining the route, the server may determine which source database is to be used for data replication and when, a method and/or time for establishing an incremental cache in the source database, which extraction and load utilities to use for extracting and loading the incremental, which utilities to attempt first, and/or the like.

At process 430, the server may begin implementing data replication using the route determined at process 420 by instructing and/or causing the source database to store an incremental on a computer readable media. Instructions to store the incremental on a compute readable media may include instructions on how to identify the incremental, when to store/create the incremental on the computer readable media, which computer readable media to store the incremental on, the technique used for storing the incremental, and how often the incremental is updated. Identifying the incremental may include a temporal reference point. For example, the server may request that the incremental be based on the last time a data replication was conducted. The server may provide a time of day and/or specify a situation for when the incremental should be created or updated. For example, the server may instruct the incremental to be created at the end of a business day. As another example, the server may instruct the incremental to be created/updated whenever database resources permit. Some databases have costs based on the number of processing cores the database is equipped with. As such, it is in the interest of the owner of such a database to ensure that all cores on the database are running at full processing capacity at all times for cost efficiency. Therefore, the server may instruct the database to create/update an incremental whenever the database is not running at full processing capacity.

The server may also instruct the database on where the incremental should be stored in the database. For example, the server may instruct the server to store the incremental on a cache of the server. The server may also set the priority of the cache. Higher levels of priority reduce the likelihood that the cache is deleted when the server needs to free up cache for other processes. In some embodiments, the server may set the priority to the highest level so that the incremental is not lost before it has been extracted.

The server may also instruct the database with the specific technique and/or utilities used to create and/or store the incremental. For example, the one or more methods of CDC discussed above in relation to FIG. 3 may be used.

At process 440, the server may extract the incremental from the source database. The server may choose the extraction utility used for extracting the incremental from the source database and/or the time and/or triggering event for the extraction. For example, some utilities for extracting data from a Teradata database include, but are not limited to, Teradata Parallel Transporter (TPT) extractor, Call-Level Interface (CLI) selector, TPT fast extract, TPT stream, and/or the like. The extraction utilities used for extracting the incremental may be based on one or more factors, such as the availability of the utility, the number of entries in the incremental, the resources available on the database, and/or the like. In some embodiments, the server may maintain and/or access a file that lists the extraction utilities that are available for a database based on the platform the database uses.

At process 450, the server may store the incremental on one or more non-transitory computer readable media. For example, the incremental may be held on local cache of the server. In some examples the incremental may be held on a Hadoop cluster. The server may choose the cache type based on the constraints caused by the technique and/or utility used for extraction, the source database file format, and/or the target database file format. In some embodiments, the cache type may be determined by the server when determining the route for data replication at process 420.

At process 460, the server may transform the data extracted at process 450 into a different file format. In some embodiments, the server may canonize the data. In some embodiments, the server may transform the data into a format based on the target database for replication. For example, the server may transform the data received from an Oracle database to a Hadoop Distributed File System (HDFS) compatible format. In some examples, the HDFS may be in canonical data format. In some examples, the specific HDFS format may be used because the target database is compatible with that file format or may have utilities for converting from that HDFS file format to a format of the target database. In some embodiments, the HDFS file format may be used as the canonical data format because many databases platforms have utilities for integrating with Hadoop. Hadoop is a powerful open source platform for parallel computing, and therefore, many utilities have been developed to integrate Hadoop with other database platforms. However, any other file formats may be used as the canonical data format including file formats for any current and/or future database platforms. Canonical, as used herein, may also be referred to as standardize and/or normalize. In some embodiments, when the target database is using the same data platform as the source database, the server may maintain the incremental in its original form because the incremental would already be in a compatible format.

At process 470, the server may load the incremental to a target database. The server may select a loading utility or technique based on the availability of the utility, availability of resources on the database, the route determined at process 420, the data format of the incremental, and/or the like. Some exemplary loading techniques include, but are not limited to, fast load, bulk load, stream, and/or the like. Each database platform may have its own set of utilities for loading the incremental that are different from other database platforms. The availability for loading the incremental may also depend on the format of the incremental. For example, if the incremental is in HDFS and being moved to a Teradata database, a subset of the utilities for loading the incremental may be compatible with HDFS.

Additionally, in some examples, the availability of a utility may depend on the number of concurrent instances that utility can be run and the number being run at the time of loading. The number of concurrent instances may sometimes be referred to as slots. For example, the target database may have five slots of bulk loading available and all five slots may be in use. In this scenario, the bulk loading utility would not be available, and the server could either wait for another slot to be available or use another loading utility. The server may also determine where the target database stores the incremental. For example, the server may cause the target database to store the incremental in a cache of the target database.

At process 480, the server may cause the target database to apply the incremental to one or more of the tables held on the target database. The server may determine which tables and the utilities used for applying the incremental to the tables in the target database. Some exemplary utilities include, but are not limited to, insert, insert not exist, insert update, insert ignore, replace, delete insert, delete and/or the like. In some examples, the server may determine the utility that is used to apply the incremental based on which utilities are available, how resource intensive the application utility is (e.g. processing power, memory use, how long the utility will take, efficiency, and/or the like), whether the utility is capable of applying the incremental, whether the utility is available, and/or the like. In some embodiments, the server may cause the database to attempt the most efficient application utility and if it errors, use the next most efficient utility.

At process 490, the server may validate that the incremental was correctly applied to the target database. In some examples, the server may validate the tables in the source database with the target database based on the number of entries. The server may check to make sure that both tables have the same number of table entries. In some examples, the server may compare a checksum or a hash of the information held in both databases for validation.

Figure 5:
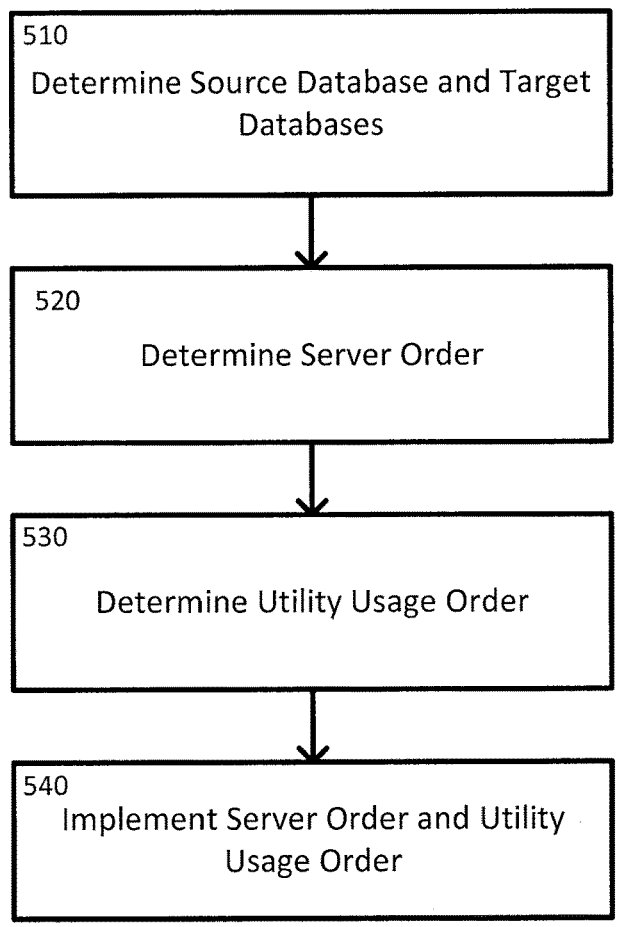
FIG. 5 is a simplified diagram illustrating an exemplary rule based method for determining a replication route.

FIG. 5 illustrates a rule based method 500 for determining a data replication route when replicating data according to some embodiments. In some embodiments, method 500 may be implemented as part of process 420 of FIG. 4.

At process 510, the server may determine the source and target databases for replication. In some examples, the server may determine the database platform being used on the source database and the target database. In some examples, there may be several target databases each using different database platforms than the source database and/or each other.

At process 520, the server may determine an order in which database and/or data are replicated and which databases and/or data are used as source databases and/or data based on predetermined rules. In some examples, the predetermined rules may be preprogrammed into the server. In some examples, the predetermined rules may be part of a file that the server uses to determine the order in which servers are to be replicated.

In some examples, the predetermined rules may specify a priority level or a ranking for each database. The priority level and/or ranking may represent or be indicative of the cost, availability, and/or importance of the server. Based on the rules, the server may attempt to limit the use of a higher ranked and/or priority level server for data replication and maximize the use of a lower ranked and/or priority level server. For example, the source database may be the highest priority of all databases that are part of the replication process, including the target databases. The server, based on this ranking, may attempt to use the source database to replicate to the lowest ranked target database and then use the target database as the source database for all other databases. In this manner, the highest ranked database is used efficiently rather than having the highest ranked database used for replicating every target database.

In some embodiments, the rules may have a cost and/or a ranking for data replication from any one server to another server. The server may then optimize the order of data replication for cost. For example, the source database may be A and there may be target databases B, C, and, D. The rules may specify that the cost of data replication between databases A and B, C, or D is 10. The rules may also specify that the cost for data replication between databases B and C or D is 5 and that the cost between databases C and D is 3. In this example, the server may determine that the cheapest route is to first replicate from database A to database C and then from databases C to databases B and D. In some embodiment, the rules may instruct the server replicate to the lowest ranked or cheapest database first. In some embodiments, the server may implement a cost efficiency algorithm to determine and/or estimate the cheapest route for replication on all the target databases.

At process 530, the system may determine the utility usage order for one or more of the replication processes (e.g. creation, extraction, load, and application of the incremental). For example, there may be several utilities that may be used for having a source database create/maintain an incremental, extract the incremental from the source database, load the incremental on a target database, and/or apply the incremental to the tables of a target database. These utilities may use different levels of processing power and may have limited availability. The predetermined rules on the server may determine which utilities to attempt first and the order in which utilities are attempted in case of failure. For example, when applying the incremental from a cache of the target database to the table, the server may instruct the target database to first attempt an insert utility. In the event that the insert utility fails to apply the incremental, the server may attempt the next utility, such as an insert not exist utility. There may be numerous reasons that cause a utility to fail, and the server may maintain a log of these failures. For example, a utility may fail when the utility has a limited number of concurrencies and all the concurrencies are in use. In some situations, the utility may not be able to apply the incremental with certain utilities because of the characteristics of the incremental and/or utility. For example, the insert utility may only work if the fields in the incremental are empty in the corresponding fields of the target database table. In some examples, the server may instruct a database to apply an incremental by attempting to use each utility in the order provided by the rules until the incremental has been successfully applied to the table or all of the utilities have failed. At process 540, the system may implement the data replication order determined in process 520 using the utility usage order determined at process 530.

Figure 6:
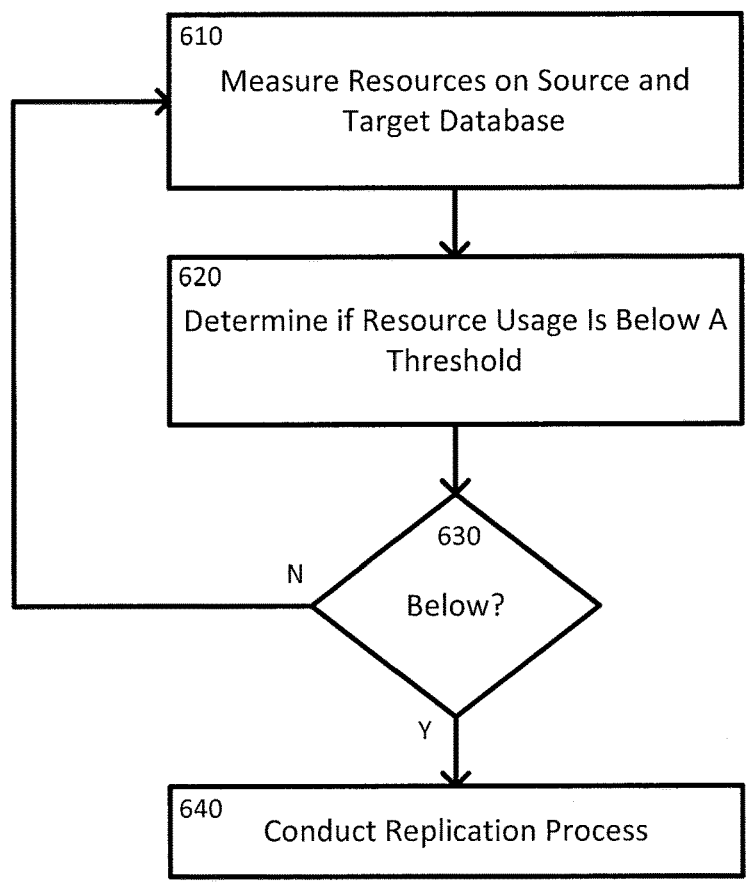
FIG. 6 is a simplified diagram of an exemplary method for dynamically determining when to begin one or more processes for replication.

FIG. 6 illustrates a method 600 for dynamically determining when to begin one or more processes for replication, such as the one or more processes of FIG. 4.

At process 610, the server may monitor the resource usage of source and/or target database for data replication. The server may monitor resources such as available memory and/or processor usage. The available resources may be periodically provided by the source and/or target databases either automatically or upon request from the server.

In some embodiments, the server may also maintain a log of the monitored resources and attach a time and date stamp to each log entry. In this manner, the log may be used to predict future resource availability.

At process 620, the server may determine whether the resources of the source and/or target databases are below a threshold for conducting one or more of the data replication processes. In some examples, the server may have a predetermined threshold for each database and/or process. For example, the threshold may be that the database be under 90% processor usage before beginning any data replication process. In another example, the threshold may be that the database be under 90% processor usage before attempting to extract an incremental.

At process 630, if the system determines that the resources are not below the threshold, the server may go back to process 610 for monitoring the resources of the database. On the other hand, if the server determines that the resources are below a threshold, the system may continue to process 640 and conduct one or more of the replication processes.

Figure 7:
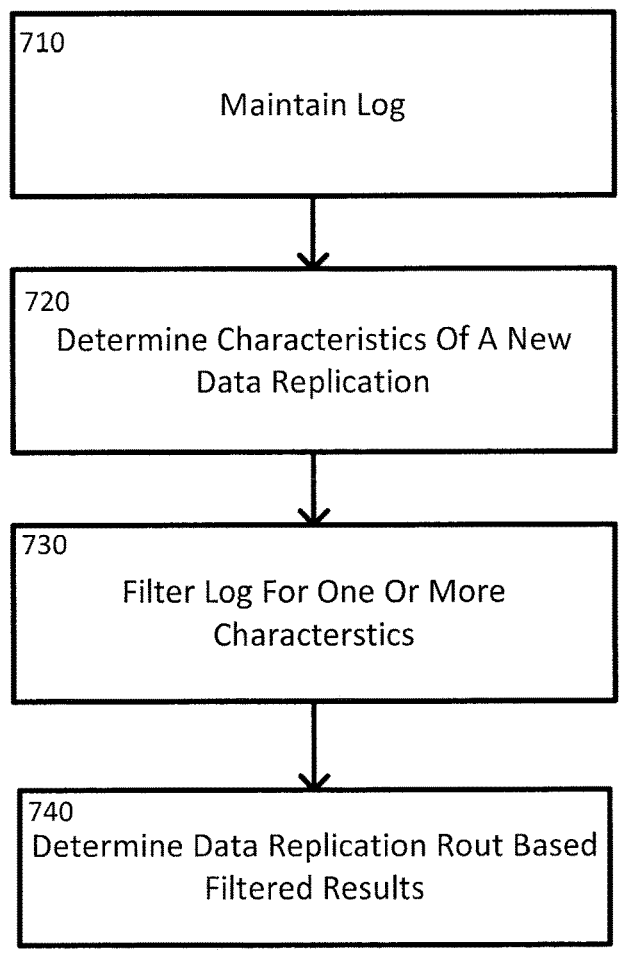
FIG. 7 is a simplified diagram of an exemplary method for selecting one or more utilities for data replication according to some embodiments.

FIG. 7 illustrates a method 700 for selecting one or more utilities for data replication according to some embodiments. In some examples, method 700 may be implemented by one or more systems or servers, such as system 300 or intermediary server 320 of FIG. 3. For ease of reference, the method is described as being performed by a single server. However the method may be performed by any suitable device or devices in concert.

At process 710, the server may maintain a log whenever a data replication is performed. The log may be held on the server or in a separate database. The log may maintain statistical information regarding every step of the data replication process and the characteristics of the databases participating in the data replication. For example, the log may record the size of the data being replicated, the servers being used in the data replication process, the data formats, the date and time of the data replication, the system resources of the databases involved (e.g. processor use, available memory, available cache, applications running, utilities running, etc.), what utilities are used for data replication, whether a utility failed or succeed and the reason, the length of time it took for the data replication, the length of time each utility took to conduct its function (e.g. incremental creation, extraction, loading, application), how much resources a utility used when executed, the efficiency of the utility, and/or the like.

At process 720, the server may determine the characteristics indicative of a new data replication job. This may include information about the databases involved, the resource available for each database, the size of the data replication, the data format of the source and target databases, time of day, and/or the like. In some examples, the server may determine these characteristics by monitoring the databases involved. In some embodiments, the server may request resource usage information from one or more of the databases.

At process 730, the server may then filter the log for one or more characteristics. For example, the server may filter the log for data replications with a size equal to or greater than the data replication size of the new data replication. The server may further filter results based on data format, database types, and/or the like. For example, the server may filter results based on the data format of the target database and the source database.

At process 740, the server may select a data replication route from the filtered results based on one or more criteria. For examples, the server may select the fastest data replication route among the filtered results or the replication route with the least number of errors. In some examples, the server may have rules regarding data replication, as discussed above, and the server may select a route based on the rules. For example, the rules may limit the amount of resources a utility can take up when executed, time of day when certain utilities can be executed, and/or the like.

While the above method is referenced with determining an entire data replication route, the above method may be modified for selecting a specific path in the data replication route. For example, when the server is selecting a utility for extracting data from a database, the server may filter a log for previous extractions with a similar signature (e.g. database type, file type, resource signature of the database, and/or the like). The server may select a utility from the filtered log based on one or more criteria (e.g. speed, error, efficiency, failure rate, etc.).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Additionally, the above examples are described in relation to a source database, intermediary server, and target database. These devices/systems may be interchangeable combined and/or merged such that some of the processes performed by each system may be performed by another system. In some embodiments, some of the system may be completely merged into another system such that the other does not exist, for example all of the function of the intermediary server may be performed by and merged into the source database. Although the methods discussed above are discussed separately, the steps discussed in each of those methods may be interchanged with and/or added to each other.

Software, in accordance with the present disclosure, such as program code, utilities, and/or data, may be stored on one or more computer readable media. It is also contemplated that software identified herein may be implemented using one or more general purpose or specific purpose computers and/or computer systems, networked and/or otherwise. Where applicable, the ordering of various steps described herein may be changed, omitted, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for data replication between databases with heterogeneous data platforms comprising:
    a non-transitory memory; and
    one or more hardware processors coupled to the non-transitory memory and configured to read instructions from the non-transitory memory to cause the system to perform operations comprising:
        determining available extraction utilities for extracting an incremental from a source database;
        determining a first extraction utility from the available extraction utilities;
        using the first extraction utility to extract the incremental from the source database and load the incremental onto a first server;
        determining available loading utilities for a target database;
        determining a first loading utility from the available loading utilities;
        loading the incremental from the first server to the target database; and
        causing the target database to update a data table in the target database with the incremental, the updating comprising repeatedly attempting to update the data table with the incremental using an unattempted application utility from a plurality of application utilities until the data table is updated or there are no more unattempted application utilities, wherein the unattempted application utility is chosen based on a cost of using the unattempted application utility.

2. The system of claim 1, wherein the unattempted application utility is chosen from the plurality of application utilities that have not been attempted based on a preprogrammed order.

3. The system of claim 1, further comprising selecting the target database from a plurality of databases based on a cost of using the target database.

4. The system of claim 1, further comprising selecting the target database from a plurality of databases based on a processor usage of the target database.

5. A computer implemented method of data replication, the method comprising:
    selecting a first extraction utility from a plurality of extraction utilities based on a data format used on a source database, wherein selecting the first extraction utility is based at least in part on a second extraction utility being unavailable, and wherein the second extraction utility is unavailable because there are no available slots on the source database for the second extraction utility;
    extracting an incremental from the source database and loading the incremental onto a server using the first extraction utility;
    selecting a first loading utility from a plurality of loading utilities based on a data format used on a target database;
    loading the incremental from the server to the target database using the first loading utility; and
    causing the target database to update a data table on the target database with the incremental, the updating comprising repeatedly attempting to update the data table with the incremental using an unattempted application utility from a plurality of application utilities until the data table is updated or there are no more unattempted application utilities, wherein the unattempted application utility is chosen based on a cost of using the unattempted application utility.

6. The computer implemented method of claim 5, wherein selecting the first extraction utility is based on an efficiency of the first extraction utility.

7. The computer implemented method of claim 5, wherein selecting the first loading utility is based at least in part on a third loading utility failing to load the incremental.

8. The computer implemented method of claim 5, the method further comprising transforming the extracted incremental from a first data format used on the source database to a second data format used on the target database before loading the incremental on target database.

9. A system for data replication comprising:
    a source database storing a first data table having first information received prior to a time point and second information received after the time point, the source database configured to create an incremental based on the second information;
    a target database storing a second data table having the first information, the target database configured to update the second data table with the incremental when the incremental is loaded in the target database such that the second data table contains both the first and second information, the updating including repeatedly attempting to update the second data table with the incremental using an unattempted application utility from a plurality of application utilities until the second data table is updated or there are no more unattempted application utilities; and
    a server including one or more hardware processors configured to execute instructions to cause the server to perform operations comprising:
        extracting the incremental from the source database and loading the incremental onto a non-transitory memory;
        selecting the target database from a plurality of databases based on a cost of using the target database; and
        loading the incremental from the non-transitory memory onto the target database.

10. The system of claim 9, wherein the source database is configured by the server to create the incremental.

11. The system of claim 9, wherein the target database is configured by the server to update the second data table with the incremental.

12. The system of claim 9, wherein the source database further comprises a first cache that the incremental is stored in when created.

13. The system of claim 12, wherein the target database further comprises a second cache that the incremental is stored in when loaded onto the target database.

14. The system of claim 9, wherein the incremental is stored on a Hadoop® cluster when extracted from the source database.

15. The system of claim 9, wherein the operations further comprise transforming the incremental from a first data format to a second data format.

16. The system of 15, wherein the first data format is a data format of the source database and the second data format is a Hadoop Distributed File System (HDFS) format.

17. The system of 9, wherein the unattempted application utility is chosen from the plurality of application utilities based on a preprogrammed order.

18. The system of 9, wherein the unattempted application utility is chosen based on a cost of using the unattempted application utility.

19. The system of 9, wherein the cost of using the target database is based on a processor usage of the target database.

20. The system of 9, wherein the extracting of the incremental from the source database includes selecting a first extraction utility from a plurality of extraction utilities based on a data format used on the source database.

\* \* \* \* \*